United States Patent [19]
Fink

[11] 3,808,707
[45] May 7, 1974

[54] PHYSICAL TRAINING SYSTEM
[76] Inventor: Clyde H. Fink, 4804 Lindale Dr., Wichita Falls, Tex. 76310
[22] Filed: Apr. 3, 1972
[21] Appl. No.: 240,694

[52] U.S. Cl.............. 35/29 A, 273/26 C, 273/29 A, 273/183 B, 273/186 R
[51] Int. Cl........................................... G09b 15/06
[58] Field of Search...... 35/1, 8 R, 8 A, 29 R, 29 A, 35/29 F, 35 A, 35 B, 35 C; 58/130; 84/454; 273/35 R, 35 A, 35 B, 183 R, 183 B, 184 R, 29 A, 186 R, 26 C; 340/279; 325/66, 361; 46/228

[56] References Cited
UNITED STATES PATENTS
2,416,353 2/1947 Shipman et al............................ 35/1
3,492,582 1/1970 Heywood....................... 35/29 R X Primary Examiner—Jerome Schnall
Assistant Examiner—Vance Y. Hum
Attorney, Agent, or Firm—Richards, Harris & Medlock

[57] ABSTRACT

In a physical training system, an audible signal comprising an analog of a physical activity is generated while an individual practices the activity to assist the individual toward optimum performance of the activity. The audible signal is equal in duration to the physical activity and varies in frequency and intensity in accordance with the rate of muscular activity and with the level of muscular exertion which characterize optimum performance of the physical activity. In one embodiment of the invention the audible signal is reproduced from a recording as the physical activity is practiced. In another embodiment the audible signal is electronically generated.

3 Claims, 7 Drawing Figures

PATENTED MAY 7 1974 3,808,707

PHYSICAL TRAINING SYSTEM

BACKGROUND AND SUMMARY OF THE INVENTION

This invention relates to physical training systems, and more particularly to a system useful in assisting an individual toward the optimum performance of a particular physical activity.

It will be appreciated that the various physical activities which a particular individual may perform require the utilization of the individual's muscles at varying rates and at varying levels of exertion. It will also be appreciated that in the case of a given physical activity, there exists a particular relationship of both rate and level of exertion of muscular activity to time which is characteristic of optimum performance of the activity. Thus, the importance of "muscular coordination" to superior performance in sports is well known. Similarly, it has long been recognized that precise control over muscular activity is necessary to the superior performance of repetitive industrial tasks.

In some individuals the ability to utilize particular muscles at precisely the correct rate and at precisely the correct level of exertion for the optimum performance of a given physical activity seems to innate. In most cases, however, it is necessary to train and practice in order to achieve superiority in the performance of a particular activity. In the past various techniques have been used to assist in the training and practice of a physical activity. Perhaps the most common technique is to employ a coach who is expert in and who has considerable experience relating to the activity. Other techniques comprise the use of pictorial illustrations showing the various steps in the activity. Motion pictures of persons recognized for their superior performance of the activity have been used to assist individuals in training and practicing the activity.

The present invention comprises a novel physical training system which augments and supplements the techniques that have been used heretofore to assist an individual toward optimum performance of a particular physical activity. It has been discovered that there exists an audible signal which comprises an analog of the precise relationship of rate of muscular activity and level of muscular exertion that are characteristic of optimum performance of a physical activity. If this audible signal is reproduced while an individual performs the activity, the individual tends to adjust the relationship of the rate of his muscular activity to time and the relationship of the level of exertion of his muscular activity to time toward the optimum rates and levels. This in turn trains the individual to perform the activity in a superior manner.

More specifically, the present invention contemplates the generation of an audible signal which varies in frequency or pitch in accordance with the rate of muscular activity which is necessary to optimum performance of a given physical activity and which varies in amplitude or loudness in accordance with the level of muscular exertion which is necessary for the optimum performance of the activity. The duration of the audible signal is equal to the period of time during which the physical activity is performed. It has been found that when such a signal is reproduced in synchronization with practice of the activity by a particular individual, the individual tends to vary his rate of muscular activity and his level of muscular exertion in accordance with the signal. This causes the individual to adjust his body movements toward the optimum, whereby with repeated practice using the audible signal the individual optimizes his performance of the activity.

DESCRIPTION OF THE DRAWINGS

A more complete understanding of the invention may be had by referring to the following detailed description when taken in conjunction with the accompanying drawings, wherein.

DETAILED DESCRIPTION

Figure 1A:
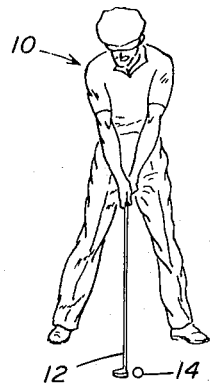
FIGS. 1A through 1D comprise diagrammatic illustrations of various steps in a golf swing.

Referring now to the drawings, the present invention will be described in conjunction with a golf swing, it being understood that the invention is equally useful in conjunction with other physical activities. FIGS. 1A through 1D comprise illustrations of sequential steps in a golf swing. Prior to the swing, a golfer 10 selects a golf club 12 and then positions a golf ball 14 on a tee or approaches the golf ball 14 at its lie on a golf course. The golfer 10 then takes his stance relative to the ball 14 and assumes the proper grip on the golf club 12.

The first portion of the golf swing comprises the "waggle", during which the golfer 10 moves the head of the golf club 12 back and forth in the region of the ball 14 but without actually striking the ball. During the waggle, the level of muscular exertion of the golfer 10 begins at a moderately high level and decreases steadily to a moderately low level as the golfer concentrates on the golf ball and on the remainder of the swing. At the same time the rate of muscular activity of the golfer 10 decreases from a moderate level at the start of the waggle to nil.

Figure 1B:
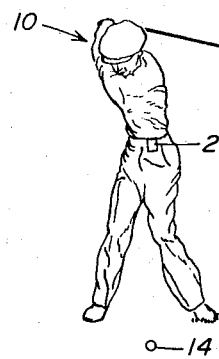

The next portion of the golf swing comprises the backswing during which the golfer 10 moves the golf club 12 from the position shown in FIG. 1A to the position shown in FIG. 1B. During the backswing the level of muscular exertion of the golfer 10 increases steadily from a level approximately equal to the level of muscular activity at the end of the waggle to a moderate level. At the same time the rate of muscular activity increases relatively rapidly from nil to a moderately high peak and then decreases very rapidly to nil.

Figure 1C:

The third portion of the golf swing comprises the downswing during which the golfer moves the golf club 12 from the position shown in FIG. 1B through the position shown in FIG. 1C. At this point the head of the golf club 12 impacts the golf ball 14 which thereupon begins its flight. During the downswing the level of muscular exertion of the golfer 10 increases steadily from the moderate level characteristic of the end of the backswing to a relatively high level. At the same time the rate of muscular activity of the golfer 10 increases from nil to a maximum just after the impact of the head of the golf club 12 with the golf ball 14.

Figure 1D:

The final portion of the golf swing comprises the follow-through during which the golfer 10 moves the golf club 12 from a position shown in FIG. 1C to the position shown in FIG. 1D. During the follow-through, the level of muscular exertion of the golfer 10 increases to a maximum and then trails off to a moderate level sufficient to maintain control over the golf club. At the same time the rate of muscular activity of the golfer 10 decreases sharply from a maximum just after the impact of the golf club 12 with the golf ball 14 to nil. At this point the golf swing is complete.

Figure 2:
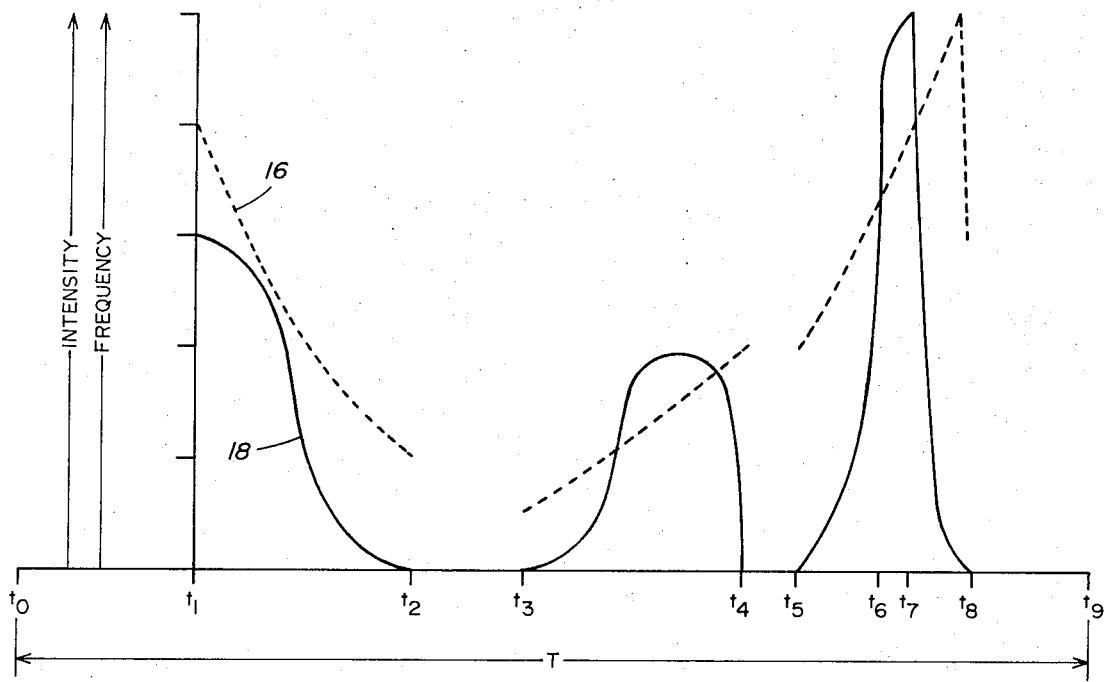
FIG. 2 is an illustration of an audible signal comprising an analog of the golf swing illustrated in FIGS. 1A through 1D.

Referring now to FIG. 2, there is shown a representation of an audible signal comprising an analog of the golf swing illustrated in FIGS. 1A through 1D. The audible signal has an overall duration T equal to the duration of the golf swing, and varies both in frequency or pitch and in intensity or loudness relative to time. This is illustrated in FIG. 2 wherein the dotted line 16 represents the intensity or loudness of the tone signal and the solid line 18 represents the frequency or pitch of the tone signal.

The initial portion of the audible signal extends from time $t_0$ to time $t_1$ during which no audible signal whatsoever is produced. This permits the golfer to take his stance and assume the proper grip on the golf club. The next portion of the audible signal extends from time $t_1$ to time $t_2$ and corresponds to the waggle of the golf swing. During this portion the audible signal commences at a moderate level both as to intensity and as to frequency. The intensity of the signal then decreases to a relatively low level as indicated by the line 16 while the frequency falls off to nil, as indicated by the line 18.

The next portion of the audible signal extends from time $t_2$ to time $t_3$. This is a silent period just prior to the backswing. The portion of the signal extending from time $t_3$ to time $t_4$ corresponds to the backswing. During this interval the audible signal begins in intensity at a moderately low level approximately equal to the intensity of the signal at the time $t_2$ and increases to a moderate level. At the same time the frequency of the audible signal increases relatively rapidly from nil to a moderate level and then drops off very rapidly to nil.

The next portion of the audible signal extends from time $t_4$ to time $t_5$. This is a silent period corresponding to a pause in the movement of the golf club at the end of the backswing and just prior to the downswing. There follows a portion of the audible signal extending from time $t_5$ to time $t_9$ which corresponds to the downswing and the follow-through of the golf swing. During this period the intensity of the audible signal increases steadily from a level equivalent to the intensity of the signal at the end of the backswing through a maximum which occurs during the follow-through portion of the swing and then decreases sharply to a moderate level sufficient to maintain control over the golf club. Simultaneously the frequency of the signal begins at nil and increases very rapidly to a maximum at time $t_7$ following impact of the club with the golf ball at time $t_6$. The frequency then decreases rapidly to nil at time $t_8$. The last portion of the audible signal extends from time $t_8$ to time $t_9$ and comprises a silent period corresponding to a pause at the end of the follow-through.

As has been indicated, the audible signal shown in FIG. 2 varies in frequency or pitch in accordance with the rate of muscular activity at each particular point in a golf swing and varies in amplitude or loudness in accordance with the level of muscular exertion at each particular point in a golf swing. At the same time it will be appreciated that the analog of the ideal golf swing of each individual will vary somewhat both as to duration of the overall signal and as to the duration of the particular segments which make up the signal. Thus, although the curves illustrated in FIG. 2 are representative curves for a golf swing, it will be understood that there exists a particular set of curves which comprises analog of the optimum golf swing for each individual golfer and that the particular curves may vary somewhat in various parameters from the curves illustrated in FIG. 2.

In accordance with the present invention, an audible signal is prepared which varies in frequency in accordance with the rate of muscular activity that characterizes the optimum golf swing for a particular individual and which varies in intensity in accordance with the level of muscular exertion that characterizes the optimum golf swing. Thereafter the audible signal is reproduced as the individual practices his golf swing. It has been discovered that when this procedure is followed, the individual will tend to adjust his rate of muscular activity and his level of muscular exertion toward the optimum as indicated by the audible signal. By this means the golfer tends to correct and improve his golf swing by simply practicing the swing while listening to the audible signal comprising the analog of the ideal golf swing.

Figure 3:
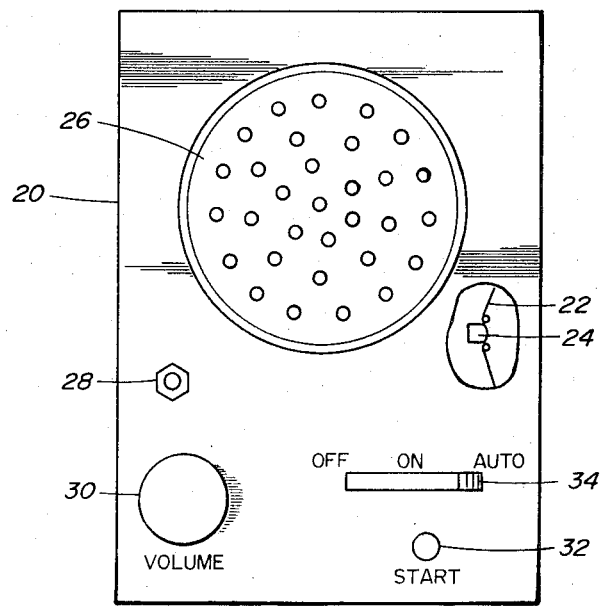
FIG. 3 is an illustration of a physical training system comprising a first embodiment of the invention.

Referring now to FIG. 3, there is shown a physical training system 20 incorporating a first embodiment of the invention. The physical training system 20 comprises an endless tape 22 which is moved over a tape play-back head 24 by conventional tape drive structure (not shown). The tape 22 bears a recording of an audible signal comprising the analog of the ideal golf swing for a particular individual, and the physical training system 20 functions to convert the recording on the tape 22 to an audible output which is transmitted to the individual through a speaker 26. The output may also be directed to the individual through earphones which are connected through a jack 28. As is conventional in such devices, the speaker 26 is disabled whenever the output of the device is transmitted through earphones connected to the jack 28.

The physical training system 20 further comprises a volume control knob 30, start button 32, and a three-way control switch 34 which is adapted to place the system 20 in "off", "on", and "automatic" modes. The "on" and "automatic" modes differ only in that when the system is in the "on" mode, it is automatically returned to the "off" mode after each reproduction of the audible signal. On the other hand, when the system is in the "automatic" mode, the audible tone signal is reproduced over and over again in repetitive fashion.

The use of the physical training system 20 is illustrated in FIG. 1. The system 20 is preferably battery driven and is similar in size to a conventional transistor radio or portable dictating machine. The system is thereby adapted for mounting at the waist of the golfer 10 in the manner most clearly shown in FIG. 1B. Whenever the golfer 10 is ready to begin a golf swing, he actuates the switch 34 to place the system 20 in either the "on" mode or in the "automatic" mode, and then depresses the start button 32 to begin the reproduction of the audible signal.

The golfer then performs his golf swing in synchronism with and during the reproduction of the audible signal. As the audible signal is reproduced it causes the golfer to adjust not only his timing but also his rate of muscular activity and his level of muscular exertion in accordance with the audible signal. By this means as the golfer continues to hit practice shots while hearing the audible tone signal, he steadily improves and adjusts his golf swing toward the optimum as represented by the audible tone signal.

Figure 4:
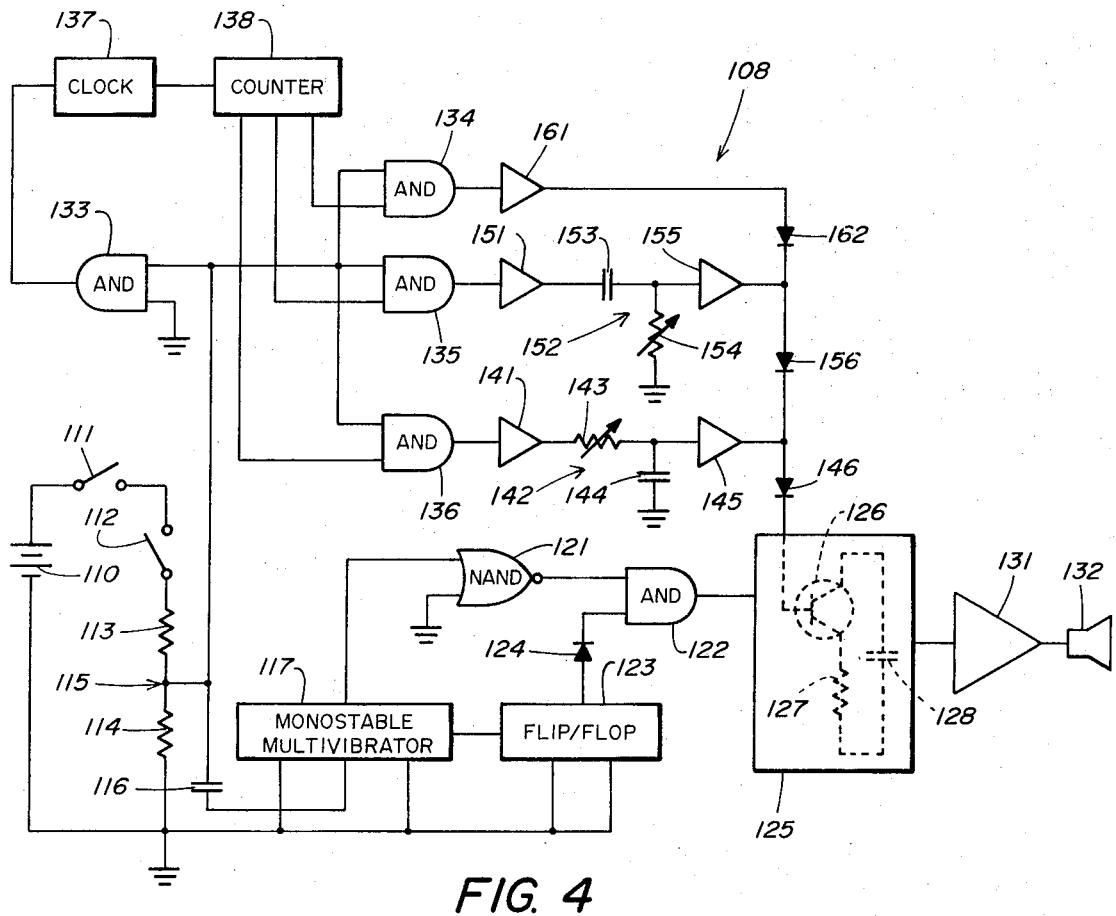
FIG. 4 is an illustration of a physical training system comprising a second embodiment of the invention.

Referring now to FIG. 4, there is shown a physical training system 108 incorporating a second embodiment of the invention. The system 108 comprises a circuit for producing an audible signal, the frequency of which is varied in accordance with a preselected program. A source of potential 110 is connected through a power switch 111 and a pair of series connected resistors 113 and 114. One end of the resistor 114 is grounded, while the other end, point 115, is connected through a capacitor 116 to the trigger input of a monostable multivibrator 117. The output of the multivibrator 117 is connected to one input of a NAND gate 121, the other input of which is grounded. The output of the NAND gate 121 is connected to one input of an AND gate 122. The output of the multivibrator 117 is also connected to the trigger input of a flip-flop 123, the output of which is connected through a diode 124 to the other input of the AND gate 122. The output of the AND gate 122 is connected to a variable frequency astable multivibrator 125.

The multivibrator 125 is of the type wherein the frequency of oscillation is varied as a function of an externally applied signal. For example, the multivibrator 125 may include a transistor 126 having its emitter-collector path connected in series with a resistor 127. A capacitor 128 is connected in parallel with both the resistor 127 and the emitter-collector resistance of the transistor 126. The base lead of transistor 126 is used as a frequency varying input of the multivibrator 125. As the current into the base of the transistor 126 is varied, the emitter-collector resistance also changes which varies the time constant of the R-C circuit comprising capacitor 128 and the resistances in parallel. The variation of the R-C time constant is used to change the frequency of oscillation of the multivibrator 125. The output of the multivibrator 125 is connected through a power amplifier 131 to a speaker 132 which produces an audible signal at the frequency of oscillation of the multivibrator 125. The multivibrator 125 is conventional in design and usage and may comprise a multivibrator of the type sold by Motorola under Part Number SN-9602.

The point 115 is also connected to one input of an AND gate 133, the other input of which is grounded, and to one input of each of three AND gates 134–136. The output of the gate 133 is connected to the trigger input of a clock 137, the output of which is connected to the counting input of a digital counter 138. Three preselected outputs of the counter 138 are connected, respectively, to the other inputs of the AND gates 134–136.

The output of the AND gate 136 is connected in series with a buffer amplifier 141 and an R-C circuit 142, comprising variable resistor 143 and a capacitor 144. The voltage across the R-C circuit 142 is applied as an input to a buffer amplifier 145, the output of which is connected through a diode 146 to the frequency varying input of the multivibrator 125. The output of the AND gate 135 is connected through a buffer amplifier 151 to an R-C circuit 152 comprising a capacitor 153 and a variable resistor 154. The R-C circuit 152 is connected as an input to a buffer amplifier 155, the output of which is coupled through diodes 156 and 146 to the frequency varying input of the multivibrator 125. The AND gate 134 is connected through a buffer amplifier 161 and diodes 162, 156 and 146 to the frequency varying input of the astable multivibrator 125.

In operation, closure of the switch 111 applies power from the DC source 110 to the start switch 112. The operation of the circuit of FIG. 4 will be described in connection with FIG. 2. At time $t_0$ of FIG. 2, the start switch 112 is closed and current flows through the resistors 113 and 114. Initially, the monostable multivibrator 117 produces a zero output to the inputs of both the NAND gate 121 and the flip-flop 123, so that they both produce zero outputs to the AND gate 122, and the astable multivibrator 125 is de-energized. When the voltage across the capacitor 116 has risen to a value sufficient to trigger the monostable vibrator 117, both the NAND gate 121 and the flip-flop 123 produce positive output signals to energize the AND gate 122. A positive output from the AND gate 122 triggers the astable multivibrator into operation so that a tone is produced by the speaker 132. The period between times $t_0$ and $t_1$ of FIG. 2 is determined by selecting the proper value for capacitor 116 to set the R-C time constant.

The frequency of the astable multivibrator may be varied in accordance with a selected sequence by means of a clock-counter and gating arrangement to program a preselected variation in the output signal from the speaker 132.

When the voltage across the capacitor 116 has reached a value sufficient to trigger the multivibrator 117, it also energizes the AND gate 133 to start the clock 137. When the clock 137 begins running, each cycle triggers a count in the digital counter 138. The counter 138 is preferably of the type whereby various output leads are energized depending upon the count stored. Three outputs of the counter 138 are selected so that AND gates 134–136 are energized at selected times. The clock 137 and the counter 138 are selected to operate together; that is, the frequency of the clock and capacity of the counter are chosen so that one entire programmed sequence of tones may be handled by the capacity of the counter 138.

The increasing count stored in the counter 138 periodically energizes circuitry which varies the signal on the variable frequency input of the multivibrator 125. For example, when the counter 138 reaches a point in the programmed cycle wherein it is desired to increase the frequency of the tone output of the speaker 132, the AND gate 136 is energized. Current flow through the R-C circuit 142 produces a varying signal at the frequency varying input of the multivibrator 125. This changes the R-C time constant of the circuit comprising capacitor 128, resistor 127 and the emitter-collector resistance of the transistor 126 to exponentially increase the frequency of the multivibrator 125. The rate of increase is a function of the value of the timing components.

When it is desired to decrease the frequency of the tone output by speaker 132, the selected output of the counter 138 energizes AND gate 135. The current flow through the R-C circuit 152 changes the current into the transistor 126 and decreases the frequency of the multivibrator 125.

When it is desired to have the frequency of the tone output by the speaker 132 remain constant, the output of the counter 138 energizes the AND gate 134 to produce a constant current into the frequency varying input of the multivibrator 125 and hold the frequency constant.

It is to be understood that many different current varying programming elements, such as the R-C circuits 142 and 152, may be used to vary the frequency of the output signal in a desired fashion. The circuit of FIG. 4 provides for programmed variation of frequency. It should also be understood that the amplitude of the output signal could also be varied in a similar fashion by providing an amplifier having a programmable gain instead of the fixed gain amplifier 131.

From the foregoing it will be understood that in accordance with the present invention, an audible signal comprising an analog of the optimum performance of a given physical activity is reproduced while the physical activity is practiced, and functions to guide an individual performing the activity toward the optimum performance thereof. The invention has been illustrated in accordance with a golf swing. However, it will be appreciated that a golf swing is representative only and that the underlying concept of the invention may be used in conjunction with many other activities. For example, the present invention is useful in optimizing an individual's performance in bowling, an individual's tennis service, an individual's performance in such diverse games as football, baseball, basketball, and the like. Furthermore, the invention is not only useful in sports-related activities, but also in optimizing an individual's performance of non-sports activities, such as repetitive industrial tasks, and the like.

It will be further understood that the specific embodiments of the invention which have been illustrated in the drawings are representative only. Thus, numerous well known recording/reproducing systems can be used instead of the magnetic tape system shown in FIG. 3. Similarly various alternative circuit arrangements can be used instead of the circuit shown in FIG. 4 to generate an audible signal electronically.

Although specific embodiments of the invention have been illustrated in the accompanying drawings and described in the foregoing detailed description, it will be understood that the invention is not limited to the embodiments disclosed, but is capable of numerous rearrangements, modifications, and substitutions of parts and elements without departing from the spirit of the invention.

What is claimed is:

1. A system for training an individual in a non-cyclical physical activity requiring non-cyclical muscular activity of the arms, torso, and legs at varying rates and at varying levels of exertion during a predetermined time period comprising generating an audible signal having a duration equal to the predetermined time period and varying non-periodically in frequency and in intensity during each individual cycle of muscular acitvity in proportion to rate of muscular activity and in proportion to level of muscular exertion, respectively.

2. The physical training process according to claim 1 further characterized by generating an audible signal which varies in frequency in accordance with the rate of muscular activity which is characteristic of optimum performance of the physical activity and which varies in intensity in accordance with the level of muscular exertion which is characteristic of optimum performance of the physical activity.

3. A system for training a non-cyclical physical activity including:

recording an audible signal which varies non-periodically in frequency in accordance with the rate of muscular activity of the arms, torso, and legs characteristic of optimum performance of a non-cyclical physical activity and which varies in intensity in accordance with the level of muscular exertion of the arms, torso, and legs characteristic of optimum performance of the physical activity; and generating the audible signal while an individual practices the physical activity and during each cycle of such activities and thereby assisting the individual toward optimum performance of the activity.

* * * * *